Oct. 17, 1939.                C. S. BROWN                2,176,523
                               TIDE GATE
                          Filed April 28, 1938
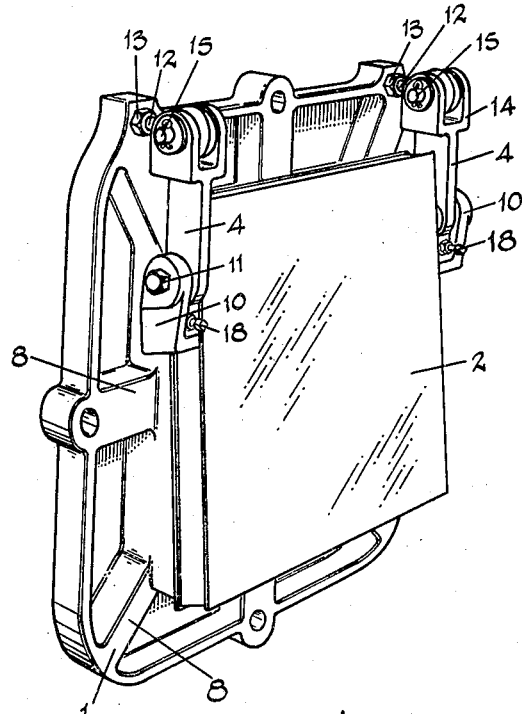
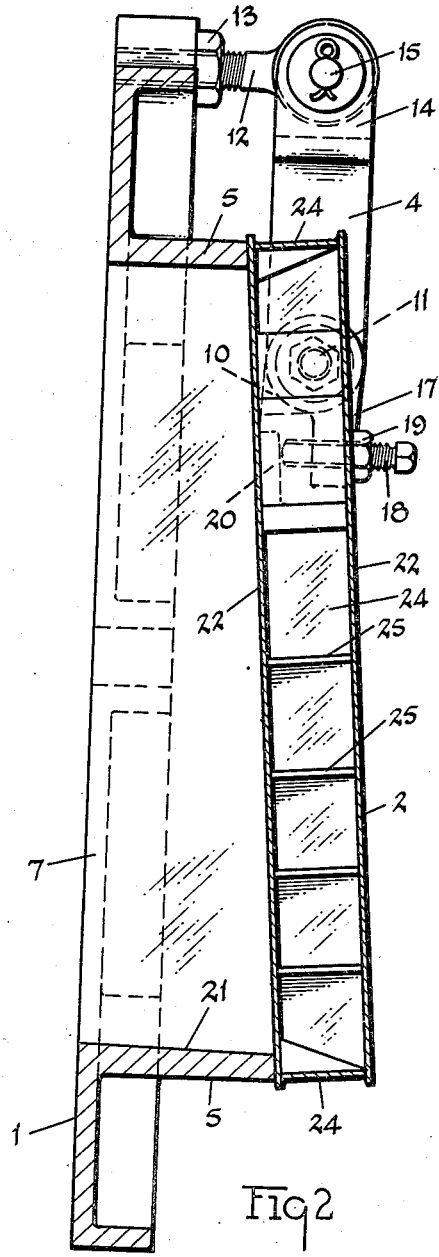
Inventor
Chalmers S. Brown
By Hurst F. Crampton
Attorney Patented Oct. 17, 1939

2,176,523

UNITED STATES PATENT OFFICE 2,176,523

TIDE GATE

Chalmers S. Brown, Lima, Ohio

Application April 28, 1938, Serial No. 204,809

1 Claim. (Cl. 251—123)

My invention has for its object to provide a tide gate having a suspended gravity-actuated movable gate member operable to open at a desired differential head pressure regardless, within limitations, of the inclination of the plane of the edge of the outlet, which is engaged by the movable gate member when closed.

The invention also has for its object to provide a sheet metal, slightly heavier-than-water, movable gate member of substantially uniform horizontal cross-section throughout its height.

The invention also has for its object to provide means for increasing the velocity of discharge of liquids of slight depth in gravity-actuated tide gates which are operable to be opened at low pressures.

The invention also provides a liquid pressure operated gate suspended by links, each link having a pivotal center intermediate the center and the upper edge of the outlet and a pivotal center above the outlet to insure closure of the gate by gravity, upon absence of a required differential gate-opening pressure and means for adjusting the upper pivotal center of the link to vary the pressure required to open the gate.

Tide gates containing the invention may be varied in their details of construction. To illustrate a practical application of the invention, I have selected a tide gate as an example of structures that contain the invention and shall describe the selected structure hereinafter. The particular structure selected is shown in the accompanying drawing.

Fig. 1 is a perspective view of the gate. Fig. 2 is a view of a vertical central section of the gate.

The gate comprises a frame 1 and a movable gate member 2 that is suspended on the frame by means of the links 4. The frame 1 has a flange 5 which forms an outlet through which the liquid may pass from any system to which the gate may be connected, such as from a sewer or material disposal system. The flange 5 extends along the edge of a central opening 7 formed in the frame 1 and forms the outlet of the system. The flange and the frame may be suitably spaced and reinforced by ribs, such as the ribs 8.

The movable gate member 2 is provided with brackets 10 which are located on opposite side edges of the gate member to dispose the links and their centers in positions to permit free pivotal or swinging movements of the upper end of the gate between the links. The brackets 10 may be secured as by welding or may be cast integral with the gate member. The lower ends of the links 4 are connected to the brackets by means of the pins 11, which may be removably secured by suitable cotter pins or nuts. The upper ends of the links are pivotally supported by an adjustable means for adjusting the gate with reference to the edge of the flange 5. In the form of the gate shown in the drawing, the upper ends of the links are connected to threaded eye-bolts 12 which may be located in tapped openings formed in the upper end of the frame and secured in their adjusted positions by the nuts 13. The upper ends of the links are bifurcated, as at 14, and are pivotally connected, by the pivot pins 15, to the eye-bolts 12. In advance of connecting the links 4 to the bolts 12, the bolts 12 may be rotated to adjustably locate the eyes of the bolts 12 with respect to the edge of the flange 5, or, more particularly, with respect to the vertical line through the center of gravity of the movable gate member 2, when closed, to produce a desired balanced or counterbalanced relation as between the effective pressure, due to its weight, to close the gate and the liquid pressure to open the gate. Thus, closure of the gate may be produced in the absence of liquid head within the system at the gate and opening of the gate may be produced upon the existence of a very small liquid head, although there may be considerable variation in the location of the frame and the edge of the flange 5 with reference to the vertical. Also, by the adjustment, variation in the required gate-opening pressure may be produced. Thus, the gate may be retained closed until the head of the liquid rises to a certain point for any desired result, such as, to produce more or less dissolution of material.

The delivery edge of the flange 5 is, preferably, located substantially in a plane inclined to the vertical and at the angle at which the inner face of the gate will normally position itself when the centers of the links are located in a vertical plane. However, owing to the fact that sea walls or river walls are often roughly formed with reference to the vertical, or the setting of the frame of the gate is often inaccurate, the outlet edge of the flange 5 is frequently disposed at angles which vary with the vertical. In order to dispose the gate to produce an opening at a very low head within the system at the gate member or a very low differential head between water within and without the gate, the adjustability of the eye-bolts 12 affords considerable latitude of placement of the frame 4 with reference to the vertical.

Also to maintain a definite relation between the movable gate member and the links and yet permit freedom of movement of the gate member as it closes, the links are provided with extensions 17 and adjustable screws 18 are located in the ends of the extensions. The brackets 10 are provided with side walls 20 which are disposed in line with the screws 18. The screws 18 may be adjusted in the extension 17 of the links 4 to engage the walls 20 of the brackets, if the gate tilts outwardly about the pins 11. The screws are secured in their adjusted positions by the nuts 19. When the links are inclined inwardly, with respect to the vertical, by adjustment of the eye-bolts 12, the weight or force of gravity on the gate member is resolved into a horizontal component which operates to press the movable gate member against the edge of the flange 5 and, thus, adjustment may be made of the eye-bolts 12 and the screws 18 to bring about accurate closing of the gate and produce a desired gate-opening pressure or maintain a desired liquid head within the system.

The adjustability of these parts enables correction of the effects of the controlling pressures, notwithstanding imperfections of wall structure or location of the frame.

Preferably, the lower part 21 of the flange 5 is inclined to the horizontal and slopes downwardly and outwardly to increase the velocity of the water and cause discharge of sediment and sewage. This is of particular advantage when the gate member is adjustably suspended to open at a very low differential head.

Where the discharge of the system through the gate is made into a body of water, and frequently below its level, the movable gate member is, preferably, formed to have a specific gravity but slightly greater than water and, thus, by the increased flotation pressure, the gate member coacts with the pressure of the liquid within the system to produce initial opening of the gate with a less differential head than is required when the level of the liquid, exterior to the gate, is at or below the lower edge of the gate. This also produces a wider opening of the gate and a larger volume of discharge of the liquid within the system although the movable gate member is set to open at a relatively low differential head. Preferably, the movable gate member is formed to have a specific gravity of 1.2. Thus, the movable gate member may be formed of sheet metal and provided with the inner and outer plates 22 and the side plates 24, which are welded together along their edges to water-seal the interior. Preferably, the movable gate member is reinforced by suitable rib parts or brackets 25 which are also welded to the space-enclosing parts to strengthen the gate member.

I claim:

In a tide gate, a movable gate member formed of water-sealed space-enclosing sheet metal parts and having a specific gravity slightly greater than that of water; a frame having a passage therethrough; a flange extending outwardly from the frame of the gate and defining an outlet for the passage and having an edge part for engagement by the movable gate member, brackets mounted on the sides of the gate member; adjustable members mounted on the frame above the said flange; links for supporting the gate member; pins for connecting the links to the adjustable members and to the brackets, the links having arms extending below the pivot pins of the brackets, the free ends of the arms having adjustable parts for engaging the brackets below the pivot pins of the bracket and coacting with the adjustable members to locate the plane of the axes of the pivot pins at desired angles with respect to the plane of the edge of the flange for varying the resistance of the gate to the gate-opening movement.

CHALMERS S. BROWN.